United States Patent
Li et al.

(10) Patent No.: US 10,451,214 B2
(45) Date of Patent: Oct. 22, 2019

(54) ANTI-ROTATION STRUCTURE, A TUBE STRUCTURE AND A PHOTOGRAPHIC SUPPORT

(71) Applicant: Guangdong Sirui Optical Co., Ltd., Zhongshan (CN)

(72) Inventors: Jie Li, Zhongshan (CN); Xiaoyun Hu, Zhongshan (CN)

(73) Assignee: GUANGDONG SIRUI OPTICAL CO., LTD., Zhongshan (CN)

( * ) Notice: Subject to any disclaimer, the term of this patent is extended or adjusted under 35 U.S.C. 154(b) by 0 days.

(21) Appl. No.: 16/175,571

(22) Filed: Oct. 30, 2018

(65) Prior Publication Data

US 2019/0101239 A1 Apr. 4, 2019

Related U.S. Application Data

(63) Continuation of application No. PCT/IB2018/056327, filed on Aug. 21, 2018.

(30) Foreign Application Priority Data

Aug. 22, 2017 (CN) .................... 2017 2 1059473 U

(51) Int. Cl.
  *F16M 11/26* (2006.01)
  *G03B 17/56* (2006.01)
(52) U.S. Cl.
  CPC ........... *F16M 11/26* (2013.01); *G03B 17/561* (2013.01); *F16M 2200/024* (2013.01); *F16M 2200/028* (2013.01)
(58) Field of Classification Search
  CPC ............................. F16M 11/26; G03B 17/561
  See application file for complete search history.

(56) References Cited

U.S. PATENT DOCUMENTS 6,536,723 B1 * 3/2003 Nakatani ............... F16B 7/14
                                                        248/163.1
6,830,227 B2 * 12/2004 Nakatani ............... F16B 7/10
                                                        248/354.3
(Continued)

FOREIGN PATENT DOCUMENTS

CN         2443185 Y      8/2001
CN         2874100 Y      2/2007
(Continued)

OTHER PUBLICATIONS

State Intellectual Property Office, International Search Report, dated Oct. 12, 2018, 6 pages.

(Continued)

*Primary Examiner* — Clayton E. LaBalle
*Assistant Examiner* — Dennis Hancock
(74) *Attorney, Agent, or Firm* — Loeb & Loeb LLP

(57) ABSTRACT

An anti-rotation structure, a tube structure, or photographic support with the anti-rotation structure comprises a first tube including a first groove or a first rib axially thereof. A second tube fitting to the first tube having an exterior thereof comprises a corresponding second rib second groove to the first groove or the first rib. When the first tube moving relative to the second tube, the first rib or the second rib moves along the corresponding second groove or the first groove. The groove defines the movement of the rib when the first tube moves relative to the second tube to effectively ensure the movement between the first tube and the second tube in a linear or straight line direction.

20 Claims, 10 Drawing Sheets

(56) References Cited

U.S. PATENT DOCUMENTS

| | | | | |
|---|---|---|---|---|
| 2015/0322986 A1* | 11/2015 | Hu | ............................ | F16B 7/04 |
| | | | | 403/314 |
| 2016/0077412 A1* | 3/2016 | Nakatani | ................. | F16B 7/149 |
| | | | | 403/377 |
| 2016/0169420 A1* | 6/2016 | Hu | ........................ | F16M 11/32 |
| | | | | 138/147 |
| 2018/0156378 A1* | 6/2018 | Hatch | .................... | F16M 11/26 |

FOREIGN PATENT DOCUMENTS

| | | |
|---|---|---|
| CN | 202302612 U | 7/2012 |
| CN | 204394549 U | 6/2015 |
| CN | 204677559 U | 9/2015 |
| CN | 2047844011 U | 11/2015 |

OTHER PUBLICATIONS

State Intellectual Property Office, Written Opinion, dated Dec. 19, 2018, 6 pages.

* cited by examiner

ANTI-ROTATION STRUCTURE, A TUBE STRUCTURE AND A PHOTOGRAPHIC SUPPORT

CROSS-REFERENCE TO RELATED APPLICATIONS

This is a US patent application claiming priority to a PCT international patent application, serial number PCT/IB2018/056327, filed on Aug. 21, 2018, which claims priority to a Chinese national application serial number 201721059473.4, filed on Aug. 22, 2017, whose disclosures are incorporated by references in their entirety herein.

TECHNICAL FIELD

The present invention may generally relate to photographic support field, and may more specifically relate to an anti-rotation structure, tube structure, and photographic support.

BACKGROUND

Tripods are essential for taking photographs, especially in the process of taking long exposure shots, such as skygazing, water falls or streams, night shots, close-ups, etc. The need for tripods therefore is not confined just to professionals; amateurs or novices would appreciate the benefit of tripods. One of the main functions of a tripod is to secure a still-image camera, a video camera, or an imaging capturing device to produce images with desirable effects on the resulting image.

A typical tripod includes a central platform rotatably connected to three legs or supports peripherally connected to the platform. The image capturing device is connected to the central platform and with varying heights permitted in the legs or supports, a user may raise or lower the height of the image capturing device. In existing tripods, each of the legs or supports includes a set of tubes arranged in a telescopic fashion to increase or decrease the length of the legs or supports. For example, each leg or support includes a first tube connecting to the platform on one end and connecting with a second tube on the other end. The second tube would connect with a third tube and so on. A nob is typically placed about the connection between the first tube and the second tube (or the second tube and the third tube, and so on) so that a user may tighten or loosen to enable the second tube to extend or retract from the other end of the first tube. A user may similar tighten or loosen another nob to extend or retract the third tube from the other end of the second tube. As the tubes are arranged in a nested arrangement, the diameter of the first tube is slightly larger than that of the second tube while the diameter of the second tube is slightly larger than that of the third tube, and so on.

Due to this arrangement, it is known that, in the process of loosening one of the nobs and in extending the length of a leg or support, the user may apply too much force in the process (either to the nob or on the tube or leg), resulting in separating the second tube from the first tube. This separation causes the end of the second tube being exposed. This significantly and negatively affect the use of the tripod, especially when the user has positioned the image capturing device to capture images and missing a leg stably supporting the image capturing device

SUMMARY

Embodiments of the invention resolve and overcome the shortcomings of the prior technology by provide a cap to the inner tube, such as the second tube, such that the cap may enable easy re-insertion of the second tube into the first tube.

In one embodiment, a first tube with its distal end may include in its interior surface at least one rib or slot axially or longitudinally disposed thereon. A second tube, fitted to the first tube, may include on its exterior surface a corresponding groove or notch to receive or accommodate the at least one rib or slot of the first tube. When the first tube and the second tube are moving with respect to each other, the at least one rib or slot of the first tube moves along the corresponding groove or notch of the second tube.

In one embodiment, the second tube includes a cap where the cap may prevent or avoid rotation (e.g., anti-rotation). In this example, the cap may include the corresponding groove or notch.

In one embodiment, the cap structure may be disposed on the distal end of the second tube.

In one embodiment, a part or portion of the second tube may match to a portion or part of the cap structure via a set of an opening on the second tube and a protrusion on the cap structure.

In one embodiment, a part or portion of the second tube may match to a portion or part of the cap structure via a set of a protrusion on the second tube and an opening on the cap structure.

In one embodiment, the first tube may include a tightening element. The tightening element may tighten the first tube to the second tube.

In another embodiment, the tightening element may include an inner adapter having a cone shape. The inner adapter may be fitted onto the exterior surface of the first tube. In another embodiment, the inner adapter includes threads on its exterior surface. In this example, the tightening element may also include an outer adapter. The outer adapter with threads on its interior surface and may connect to the inner adapter through the threads.

In another embodiment, the tightening element may include a locking ring disposed on the outer adapter. In one example, the locking ring may halt or stop movement of the cap away from or out of the second tube when the cap moves to the locking ring.

Another embodiment of the invention may provide a tube structure having at least two sets of caps arranged therewith. In this example of the at least two sets of caps, one set of the caps may include its second tube to be fitted or sleeved to a first tube of another set of the caps.

Aspects of the invention also provide a photographic support with at least one tube having the tub structure as described above.

Moreover, embodiments of the invention provide one or more following advantages:

1. The cap structure provided in one embodiment of the invention include: a first tube with its distal end may include in its interior surface at least one rib or slot axially or longitudinally disposed thereon. A second tube, fitted to the first tube, may include on its exterior surface a corresponding groove or notch to receive or accommodate the at least one rib or slot of the first tube. When the first tube and the second tube are moving with respect to each other, the at least one rib or slot of the first tube moves along the corresponding groove or notch of the second tube. In existing approach, when the first tube and the second tube are moving against each other, due to the forces that are applied, the tubes tend to rotate in directions that are opposite to one another.

According to aspects of the invention, when the first tube is moving relative to the second tube, the groove or notch limits or defines movement of the rib or slot therewithin. By defining or limiting the movement, the movements between the first tube and the second tube may be more defined or limited to a linear movement.

2. Aspects of the invention provide the cap disposed in the distal end of the first tube, and the cap may include rib or slot disposed thereon. When the rib or slot may be damaged from use, a user may quickly and conveniently replace the cap such that the first tube and the second tube may resume operation without issues.

3. In one embodiment, a part or portion of the first tube may match a part or portion of the cap structure via a set of an opening on the first tube and a protrusion on the cap structure. Through the opening/hole and the corresponding protrusion, embodiments of the invention may maintain stability of the connection.

4. In another embodiment, a tightening element may include an inner adapter having a substantially cone shape, with a narrower circumference facing toward the first tube. The inner adapter may be fitted onto the exterior surface of the first tube. In another embodiment, the inner adapter includes threads on its exterior surface. In this example, the tightening element may also include an outer adapter. The outer adapter with threads on its interior surface and may connect to the inner adapter through the threads.

In one operation, when a user wishes loosen the connection between the first tube and the second tube, the user may rotate the outer adapter. Due to the substantially cone shape of the inner adapter, when the outer adapter may move away from the inner adapter along the threads, the tightening force applied on the inner adapter decreases as the outer adapter moves away from the narrower circumference end of the inner adapter for easier loosening.

5. In another embodiment, the tightening element may include a locking ring disposed on the outer adapter. In one example, the locking ring may halt or stop movement of the cap away from or out of the second tube when the cap moves to the locking ring.

In one example, when the first tube and the second tube may be separating completely away from one another in a situation where the cap may be moving to a position of the locking ring, as the locking ring may be stationary or fixed on the second tube, the locking ring may block or inhibit that separation of the cap.

BRIEF DESCRIPTION OF THE DRAWINGS

In order to more clearly illustrate embodiments of the invention, the following figures provide exemplary but simplified illustrations. The following figures further illustrate exemplary embodiments, so to those skilled in the art without undue experimentation may appreciate other figures of aspects of the invention based on these figures.

Identification of the reference numbers in the figures.

1—a first tube; 11—a first rib; 2—a second tube; 21—a second groove; 5—a cap structure; 6—an opening; 7—a protrusion; 8—a tightening element; 81—an inner adapter; 82—an outer adapter; 83—a locking ring; 84—an outer sleeve.

DETAILED DESCRIPTION

A clear and complete description of the technical schemes of the present application is given below, in conjunction with the accompanying drawings. Apparently, the described embodiments are a part, but not all, of the embodiments of the present application. All the other embodiments, derived by a person skilled in the art on the basis of the embodiments described in the present application without undue experimentation or labor, are included in the protection scope of the present application.

In the description of the present application, it needs to be noted that, unless specifically defined or restricted otherwise, terms such as "center," "up," "down," "left," "right," "vertical," "horizontal," "inner," "outer," etc., that denote directional or positional relationship may be directional or positional relationship as referenced in the figures. They are merely used for description and illustration purposes and do not instruct or imply that a device or element must possess the specific direction or a specific directional structure and operation. As such, they are not meant to be limiting. Moreover, terms such as "first," "second," or "third," are merely for description purposes and should not be interpreted to instruct or imply a degree of importance.

In the description of the present application, it is to be noted that, unless specifically defined or restricted otherwise, terms such as "mount", "interconnect", "connect" should be broadly construed, for example, they may be fixed connection or detachable connection or integral connection; they may be mechanical connection or electrical connection; they may be direct connection, or indirect connection via an intermediate medium, or internal communication between two units; they may be wireless connection, or wired connection. For a person skilled in the art, the specific meaning of the aforementioned terms in the present application can be understood according to specific situations thereof.

Furthermore, the technical features involved in the various embodiments of the present application described below can be combined with one another as long as they do not conflict with one another.

Embodiment 1

Figure 1:
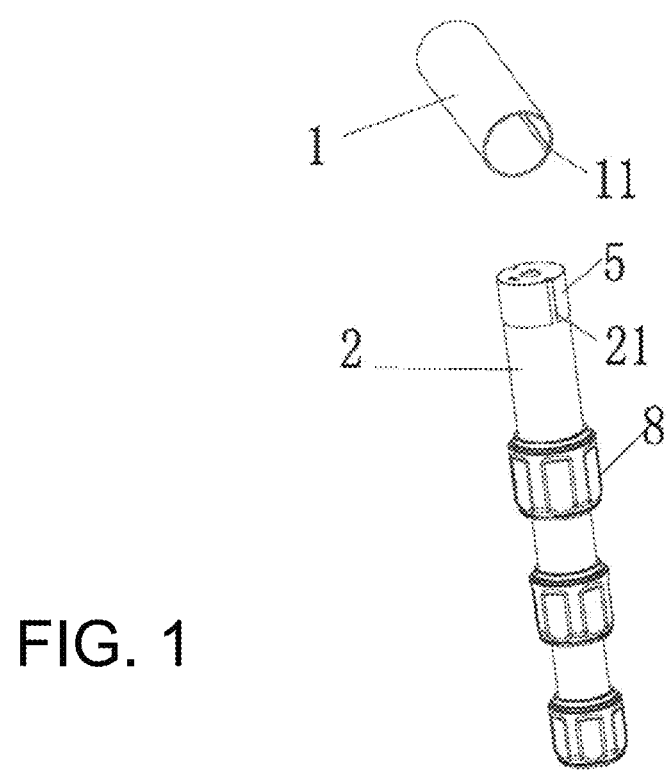
FIG. 1 is a perspective view of an embodiment of a cap of a tripod leg or support as used with the tripod leg or support according to one embodiment of the invention.

According to an anti-rotation structure, as shown in FIG. 1, a first tube 1, with its distal end may include in its interior surface at least one rib 11 axially or longitudinally disposed thereon. A second tube 2 may be fitted to or sleeved over the first tube 1. The second tube 2 may, on its exterior or outer tube surface, form a corresponding groove 21 to the at least one rib 11. As the first tube 1 correspondingly move with respect to the second tube 2, the at least one rib 1 may define a movement along the groove 21.

In another embodiment, the use of the at least one rib 1 and the groove 21 may be exchanged. For example, in one embodiment, the first tube 1 may, instead of the at least one rib 1, include a groove whereas the second tube 2 may include a corresponding at least one rib for the groove.

In existing art, when the first tube and the second tube are moving against one another, due to the forces applied, the first tube and the second tube may be rotated.

In the present embodiment, when the first tube 1 is moving relative to the second tube 2, the groove 21 may limit or define movement of the rib 1. By defining or limiting the movement, the movements between the first tube 1 and the second tube 2 may be more defined or limited to a linear movement.

Figure 2:
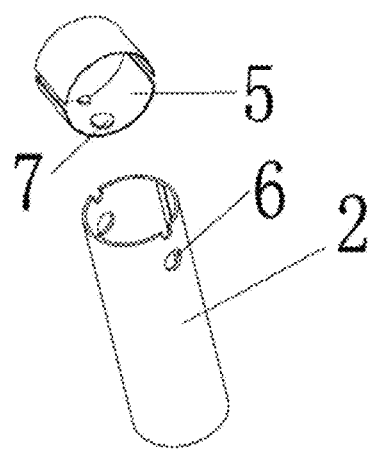
FIG. 2 is a perspective view an embodiment of a cap of a tripod leg or support as used with a second tube of the tripod leg or support according to one embodiment of the invention.

In embodiments as illustrated in FIG. 2, the second tube 2 includes a cap structure 5 on a distal end of the second tube 2. The rib or the groove is disposed on the cap structure 5.

Through the cap structure 5, when the rib or the groove may be damaged from use, the cap structure 5 may quickly and conveniently replaced without interfering the use of the tubes, which may be part of a photographic support, such as a tripod or monopod.

In a further embodiment, the cap structure 5 may be sleeved or fitted to the second tube 2. A portion or part of the second tube 2, as shown in FIG. 2, may match to a portion or part of the cap structure 5 by a set of an opening 6 on the first tube 1 and a protrusion 7 on the cap structure 5. This may ensure the stability of connection between the first tube 1 and the cap structure 5.

In another embodiment, a portion or part of the second tube 2 may match to a portion or part of the cap structure 5 by a set of a protrusion 7 on the first tube 2 and an opening 6 on the cap structure 5.

Figure 3:
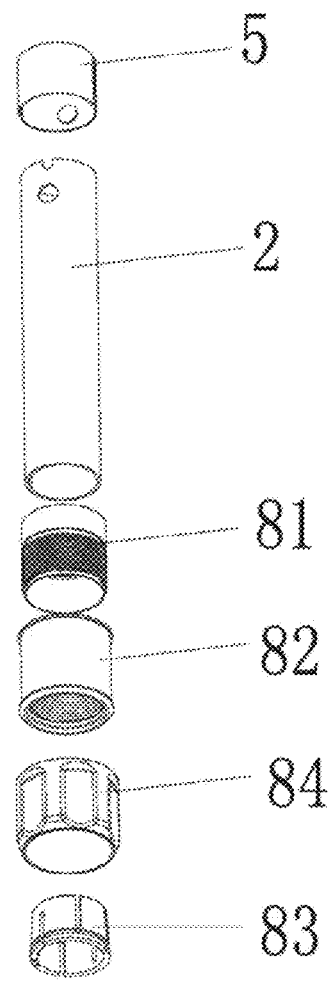
FIG. 3 is a perspective view another embodiment of a cap of a tripod leg or support as used with a second tube of the tripod leg or support according to one embodiment of the invention.

According to an embodiment as shown in FIG. 3, the first tube 1 may be mounted or fitted with a tightening element 8. The use may use tightening element 8 to tighten or decrease movement when the first tube 1 is connected to the second tube 2.

In a further embodiment, the tightening element 8 may include an inner adapter 81 having a substantially cone shape disposed on the exterior or outer surface of the first tube 1. The inner adapter 81 may include threads on its outer or exterior surface. The tightening element 8 may also include an outer adapter 82 and the outer adapter 82 may be connected to the inner adapter 81 via the threads. An outer sleeve 84 disposed on the exterior of the outer adapter 82 may enhance comfort in its use.

When loosening the connection between the first tube 1 and the second tube 2, a user may rotate or turn the outer adapter 82. Due to the substantially cone shape of the inner adapter 81, as the outer adapter 82 moves away or separates from the inner adapter 81, forces applied on the inner adapter 81 decreases, which may be beneficial for separating.

Similarly, the tightening element 8 further includes a locking ring 83 mounted or disposed on the outer adapter 82. When the cap structure 5 moves to a position of the locking ring 83, the locking ring 83 may prevent or inhibit the cap structure 5 separate from the second tube 2. When the first tube 1 and the second tube 2 appear to be separated from one another, the cap structure 5 disposed on the first tube 1 may move to the position of the locking ring 83. As the locking ring 83 may be affixed securely or be stationary on the second tube 2, the locking ring 83 may prevent or block the movement of the cap structure 5 to be separated.

In a further embodiment, the inner adapter 81 may be affixed to a bottom end of the second tube via adhesives, and the locking ring 83 may be secured on the inner adapter 81.

Embodiment 2

Another embodiment of the invention provides a tube structure, where the tube structure may provide at least two sets of the cap structure 5 as described in Embodiment 1. The second tube of one set may connect on the exterior to the first tube of another set.

Embodiment 3

Embodiment of the invention provide a photographic support with at least one leg of the support include the tube structure of Embodiment 2.

Figure 4:
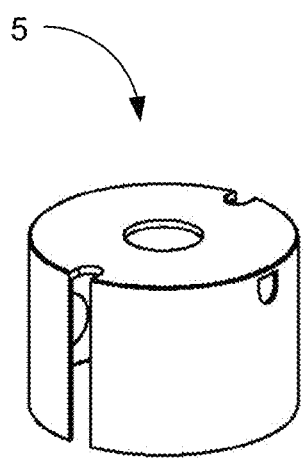
FIG. 4 is a perspective view of a cap structure of a tripod leg or support according to one embodiment of the invention.
Figure 5:
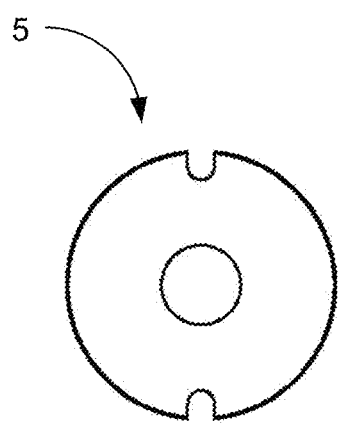
FIG. 5 is a top view of a cap structure of a tripod leg or support according to one embodiment of the invention.
Figure 6:
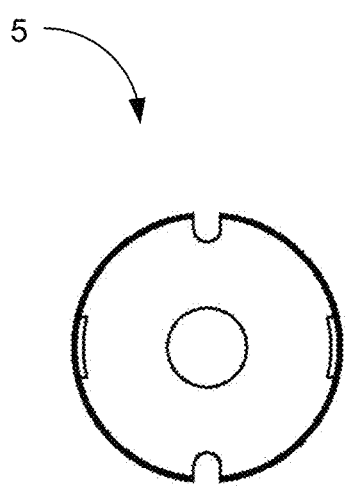
FIG. 6 is a bottom view of a cap structure of a tripod leg or support according to one embodiment of the invention.
Figure 7:
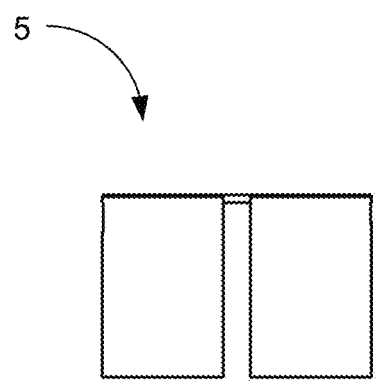
FIG. 7 is a left-side view of a cap structure of a tripod leg or support according to one embodiment of the invention.
Figure 8A:
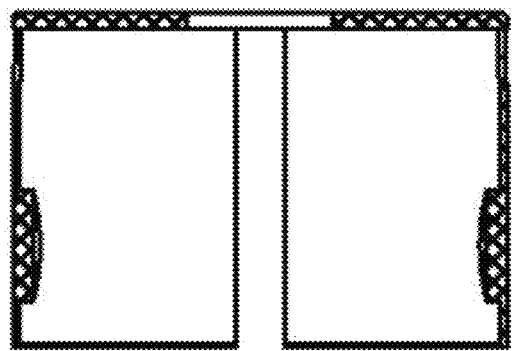
FIG. 8A and FIG. 8B are diagrams showing a right-side cross-sectional view of a cap structure of a tripod leg or support according to one embodiment of the invention.
Figure 8B:
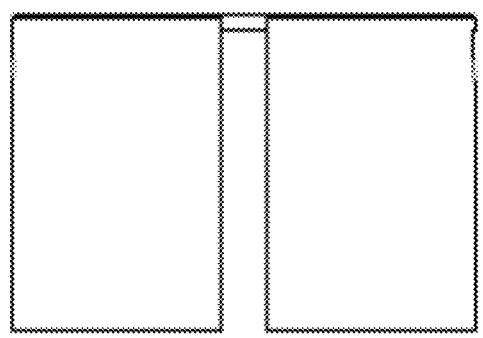
Figure 9:
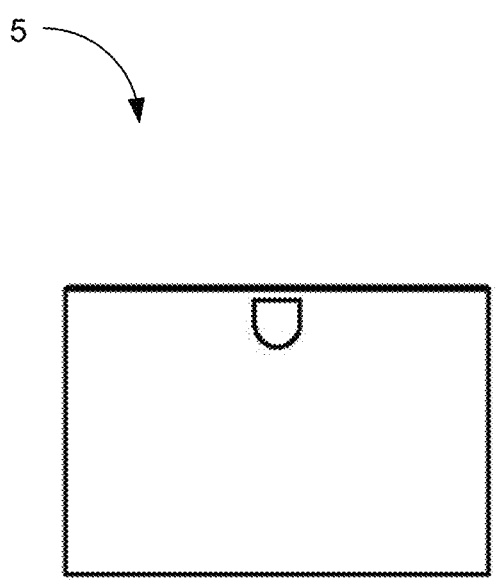
FIG. 9 is a frontal view of a cap structure of a tripod leg or support according to one embodiment of the invention.
Figure 10A:
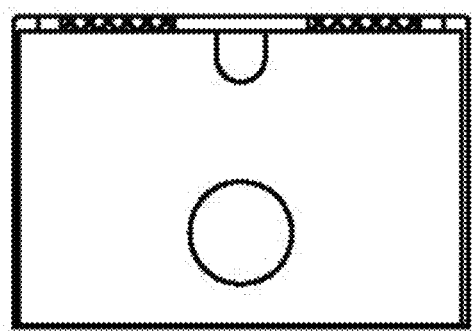
FIG. 10A and FIG. 10B are diagrams showing a rear view of a cap structure of a tripod leg or support according to one embodiment of the invention.
Figure 10B:
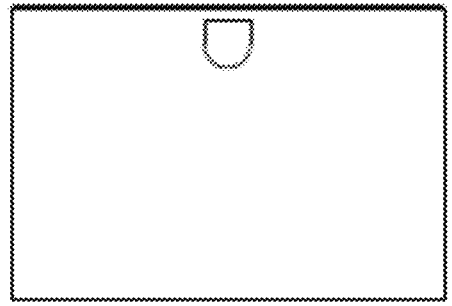

To further illustrate the cap structure 5, FIG. 4 is a perspective view of the cap structure 5. FIG. 5 is a top view of the cap structure 5. FIG. 6 is a bottom view of the cap structure 5. FIG. 7 is a left-side view of the cap structure 5. FIG. 8A and FIG. 8B are diagrams showing a right-side cross-sectional view of the cap structure 5. FIG. 9 is a frontal view of the cap structure 5. FIG. 10A and FIG. 10B are diagrams showing a rear view of the cap structure 5.

Apparently, the aforementioned embodiments are merely examples illustrated for clearly describing the present application, rather than limiting the implementation ways thereof. For a person skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present application.

What is claimed is:

1. An anti-rotation structure for a photographic equipment that includes a leg with a first tube and a second tube, said anti-rotation structure comprising:
    an end cap configured to engage a distal end of the second tube, the end cap comprising:
        an end plate with an opening formed therethrough, wherein the end plate configured to abut the distal end of the second tube;
        a side wall connecting with the end plate along the circumference of the end plate;
        wherein the side wall comprises at least one slit extending axially;
        wherein the at least one slit corresponds in size to a rib disposed at an interior surface of the first tube of the leg such that the rib moves along the at least one slit when the first and second tubes are joined to one another;
    wherein the at least one slit is communicative with the opening of the end plate; and
    wherein no portion of the first tube passes through the opening into an interior of the second tube when the first and second tubes are joined to one another.

2. The anti-rotation structure of claim 1, wherein the opening is formed at center of the end plate of the end cap.

3. The anti-rotation structure of claim 1, wherein the end cap further comprising a protrusion on the side wall, wherein the protrusion matches to a tube opening on the second tube.

4. The anti-rotation structure of claim 1, wherein the opening is formed near the circumference of the end plate of the end cap.

5. The anti-rotation structure of claim 1, wherein the at least one slit extends to the end plate with a cut.

6. An anti-rotation structure for a photographic equipment that includes a leg with a first tube and a second tube, said anti-rotation structure comprising:
- an end cap configured to engage a distal end of the second tube, the end cap comprising:
  - an end plate with an opening formed therethrough, the end plate configured to abut the distal end of the second tube;
  - a side wall connecting with the end plate along the circumference of the end plate;
  - wherein the side wall comprises at least one protrusion extending axially;
  - wherein the at least one protrusion corresponds in size to a bore disposed at a side wall of the second tube of the leg such that the at least one protrusion fits into the bore when the first and second tubes are joined to one another; and
  - wherein no portion of the first tube passes through the opening when the first and second tubes are joined to one another.

7. The anti-rotation structure of claim 6, wherein the opening is formed near the circumference of the end plate of the end cap.

8. The anti-rotation structure of claim 6, wherein the end cap further comprising a slit extending axially along the side wall, wherein the slit defining a sliding path for a rib on an interior wall of a first tube.

9. The anti-rotation structure of claim 6, wherein the opening is formed near center of the end plate of the end cap.

10. The anti-rotation structure of claim 8, wherein the slit extends to the end plate with a cut.

11. A leg of a photographic support structure comprising:
- a first tube including a first defining structure disposed axially on its interior surface;
- a second tube fitting to the first tube;
- an anti-rotation structure abutting a distal end of the second tube;
- wherein the anti-rotation structure comprising:
  - an end plate with an opening formed therethrough, wherein the end plate configured to abut the distal end of the second tube;
  - a side wall connecting with the end plate along the circumference of the end plate;
  - wherein the side wall comprises a corresponding structure for receiving the first defining structure extending axially along the side wall;
  - wherein the first tube moves relative to the second tube along the corresponding structure of the anti-rotation structure and the first defining structure when the first and second tubes are joined to one another;
  - wherein the at least one slit is communication with the opening on the end plate; and
  - wherein no portion of the first tube passes through the opening into an interior of the second tube when the first and second tubes are joined to one another.

12. The leg of the photographic support structure of claim 11, further comprising a tightening element for connecting the first tube and the second tube, wherein the tightening element comprises an inner adapter with threads on a portion of its exterior surface disposed on an exterior surface of the first tube; and an outer adapter connecting to the inner adapter via the threads of the inner adapter.

13. The leg of the photographic support structure of claim 12, wherein the inner adapter comprises a substantially cone shape.

14. The leg of the photographic support structure of claim 13, wherein a narrower circumference of the inner adapter is positioned toward the anti-rotation structure.

15. The leg of the photographic support structure of claim 12, further comprising a locking ring disposed on the outer adapter, wherein the locking ring prevents the anti-rotation structure separating from the second tube when the anti-rotation structure moves to a position of the locking ring.

16. The leg of the photographic support structure of claim 11, wherein the corresponding structure extends to the end plate with a cut.

17. The leg of the photographic support structure of claim 11, wherein the first defining structure comprises a first rib.

18. The leg of the photographic support structure of claim 11, wherein the anti-rotation structure further comprising a protrusion on the side wall, wherein the protrusion matches to a tube opening on the second tube.

19. The leg of the photographic support structure of claim 11, wherein the anti-rotation structure further comprising an opening on the side wall, wherein the opening matches to a tube protrusion on the second tube.

20. The leg of the photographic support structure of claim 11, wherein the opening is formed either at center of the end plate or near the circumference of the end plate of the end cap.

* * * * *